May 29, 1956  J. B. SMITH  2,747,900

PACKED SLEEVE PIPE COUPLING

Filed Sept. 6, 1952

INVENTOR.
JOSEPH B. SMITH
BY Woodling and Krost
attys

United States Patent Office 2,747,900
Patented May 29, 1956

2,747,900

PACKED SLEEVE PIPE COUPLING

Joseph B. Smith, Berea, Ohio

Application September 6, 1952, Serial No. 308,182

1 Claim. (Cl. 285—196)

The invention relates to pipe couplings and more particularly to pipe couplings for joining pipe-line sections quickly and securely whereby the amount of time that the line is out of service is reduced to a minimum.

This invention is an improvement over Patent No. 2,567,243 dated September 11, 1951, and entitled "Sleeve Coupling for Pipes," for small sized pipe couplings, preferably in sizes ranging below three inches.

An object of the invention is the provision of a pipe coupling having an endless packing member compressed sidewise for squeezing same against a pipe inserted in the coupling, taken in combination with radially extending threadable clamping elements for engaging the pipe to resist longitudinal movement of the pipe from the coupling.

Another object of the invention is the provision of a coupling which may be readily connected to a pipe-line section by hand tools to restore service quickly and which may be subsequently welded to the pipe while in service for making a permanent connection.

Another object of the invention is the provision of a coupling having radially extending threadable openings with threadable clamping elements recessibly disposed therein for engaging the pipe, and with said holes being plug welded to permanently seal said holes.

Another object of the invention is the provision of a coupling having annularly spaced openings extending longitudinally inwardly from the ends thereof to assist in cold relieving of welding stresses.

And another object of the invention is to construct such coupling of composite pieces in a unique manner such that no precautions are required to seal the assembled parts against leakage, and to provide endless solid pressure rings to press the pipe packing seal into sealing engagement with the pipe.

Figure 1:
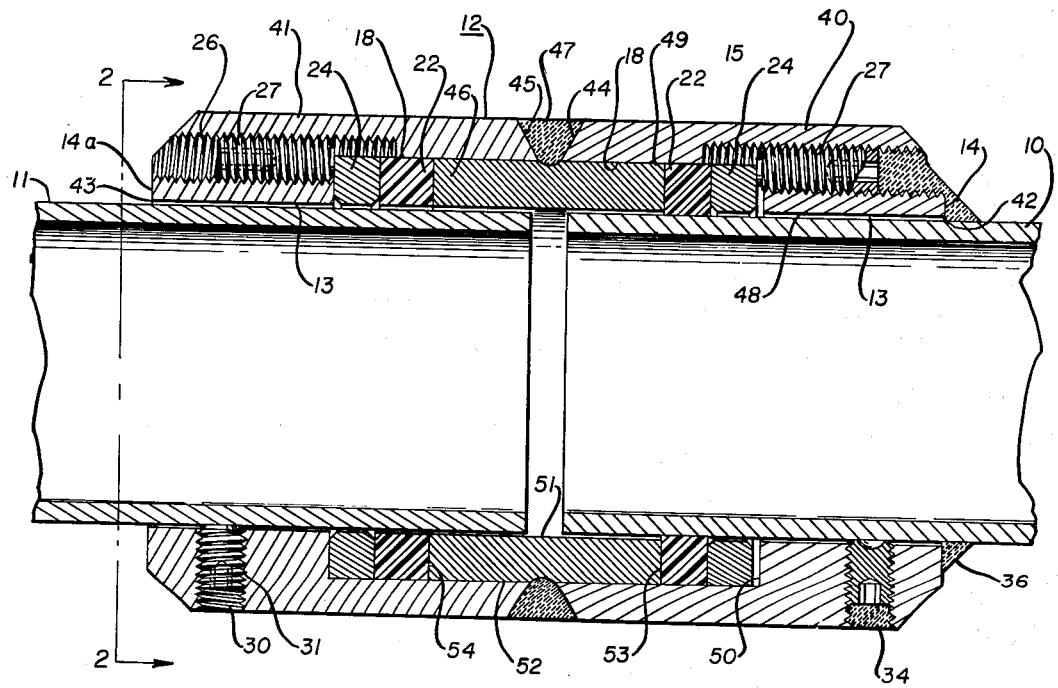
Figure 2:
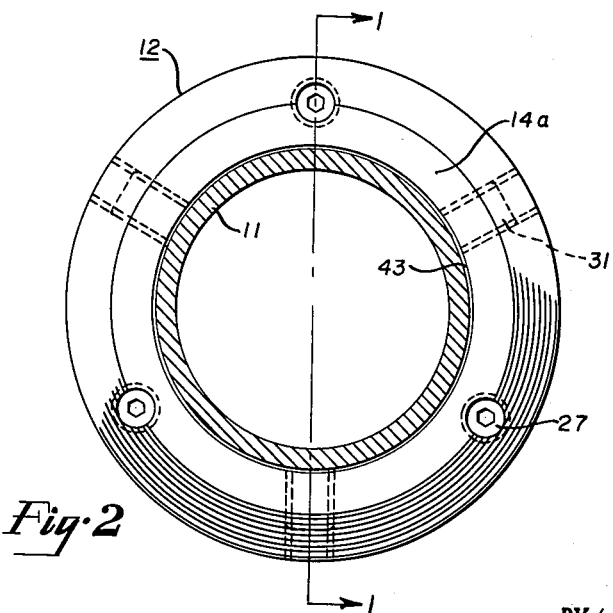

Other objects and a fuller understanding of the invention may be had by referring to the following description and claim, taken in conjunction with the accompanying drawings, in which:

Figure 1 is a longitudinal cross-sectional view of a coupling embodying the invention, taken along the line 1—1 of Figure 2, the left-hand portion of the coupling being shown with the packing and the packing-pressure devices in their position prior to stressing and welding, whereas the right-hand side is shown fully stressed into fluid type relationship with the pipe and permanently welded to seal the coupling and pipe as a unit; and Figure 2 is a cross-sectional view taken along the line 2—2 of Figure 1 and shows principally the end view of the coupling.

The coupling comprises principally a composite annular sleeve 12 having a bore 13 adapted to receive pipes 10 and 11 respectively. The two end portions of the pipes 10 and 11 extend into the sleeve 12 and substantially meet intermediate the ends of the sleeve. In the preferred embodiment of the invention, the composite annular sleeve 12 is composed of a first sleeve section 40 and a second sleeve section 41. Each of the sleeve sections has an entrance end. The entrance to the first sleeve section 40 is referred to by the reference character 42, and the entrance end in the second sleeve section 41 is referred to by the reference character 43. The reference characters 44 and 45 refer to the butt ends of sleeve sections 40 and 41 respectively. Each sleeve section 40 and 41 has an external annular end surface referred to by the reference characters 14 and 14a.

The sleeve sections are joined in end-to-end relationship with the butt ends thereof together and with a ring sleeve liner 46 bridging between the first and second sleeve sections internally thereof. In the illustration of the preferred embodiment of the invention as set forth in the drawings, the first and second sleeve sections and the ring sleeve liner are all rigidly joined together as a composite unit by welding. The weld joining these members together as a composite unit is indicated by the reference character 47. The weld 47 penetrates down into the body of the sleeve liner 46 and, therefore, prevents longitudinal shifting of the ring sleeve or either of the ring sleeve sections with respect to one another. Although welding is illustrated, it is within the scope of this invention to join the three sections together by mechanical means if desired. A thorough fluid seal is not required at the juncture, and accordingly the weld 47, or the mechanical joining means, is provided primarily for strength purposes. Rigid inspection of the weld 47 is not required with respect to fluid tightness.

Each of the sleeve sections 40 and 41 have a stepped internal wall defined by a first bore beginning at the entrance end and a second bore beginning at the butt end. In the first sleeve section 40 the first bore is referred to by reference character 48 and the second bore by the reference character 49. Sleeve section 42 has an identical stepped relationship. The first and second bores 48 and 49 are connected by a radially extending shoulder wall 50.

The sleeve liner 46 has an internal wall 51 which is substantially identical in size and form with the first bore 48 and has an external wall 52 which is substantially identical in size and form to the second bore 49. The external wall 52 fits into the second bore 49 of the two sleeve sections in close relationship but not in a fluid tight relationship. That is, there will be a fluid leakage passageway between the external surface and the internal walls of the sleeve sections. The length of the ring sleeve liner 46 is less than the combined length of the second bores of sleeve sections 40 and 41 and is substantially centrally located with respect to the composite sleeve. The sleeve liner 46 has end walls 53 and 54 which provide radially extending wall surfaces spaced from the shoulder walls 50 of the first and second sleeve sections.

Inasmuch as the construction of the sleeve at each end is identical, the description hereafter will be devoted principally to the right-hand end thereof embodying the sleeve section 40 with regard to the arrangement of the internal parts for making the seal between the sleeve and the pipe which is inserted therein.

Extending radially outwardly from the bore 13 of the sleeve 12 and disposed longitudinally inwardly from the external end surface 14 is an internal groove 15 having opposite end walls provided respectively by the shoulder wall 50 and the end wall 53 previously described. Bridging between the wall 50 and the wall 53 is a section 18 of the internal annular wall of the second bore 49, thus completing the internal groove 15. Within the internal groove 15 is an endless packing member 22 which may be constructed of any suitable deformable material of rubber-like nature. The left-hand side of packing member 22 faces the end wall 53 of the groove. Mounted adjacent to the right-hand side of the packing member 22 is an endless ring 24. As shown in Figure 1, the endless ring 24 is adapted to be pressed sidewise to the left against the endless packing member 22. A plurality, three in the embodiment illustrated, of threaded openings 26 extend from the annular end surface 14 of the sleeve to the shoulder wall 50 of the internal groove 15. Threaded thrust members of set screws 27 are threadably engaged within the openings 26 and are adapted to extend into the internal groove 15 and force the endless ring 24 against the endless packing member 22.

The segmental ring members as set forth in Patent No. 2,567,243 are desirable for large pipe couplers and may be inserted into the internal groove and reassembled in the internal groove. This invention is provided especially for smaller sized couplings although may well be employed for large couplings in some instances. A composite assembly makes possible the use of only one endless ring thrust member. In assembling the parts to produce this improved structure, the endless ring 24 is placed against the shoulder wall 50, and then the packing member may be inserted in front of the endless ring, if desired. However, the packing material, being pliable, may be inserted after the composite coupling is entirely assembled. After placing the endless ring against the wall, the ring sleeve liner 46 is inserted into the second bore 49. The second section is then reassembled with an endless ring, and the second end of the ring sleeve liner 46 is inserted into the second bore of sleeve liner 41. The position of the sleeve liners is then centered between the sleeve sections, and the weld 47, or other holding means, is used to permanently join the sleeve coupling into permanent relationship.

Placed annularly about the outside of the sleeve are a plurality of threaded holes 30 to receive threadable clamp elements or set screws 31 for radially clamping the pipe to prevent longitudinal movement of the pipe from the sleeve. The set screws 27 and 31 are preferably of the hollow-head type adapted to be engaged by a suitable interfitting tool.

In assembly when the parts are mounted as shown in Figure 1, the thrust set screws 27 are screwed in by a suitable tool until the packing 22 is pressed sidewise and squeezed tightly against the outer surface of the pipe 10 and simultaneously is squeezed into the tiny leakage passageway remaining between the external wall 52 of the ring sleeve liner 46 and the wall of the second bore 49. The small leakage passageway between these surfaces need not be of concern when constructing the composite coupling because the packing 22 will naturally tend to squeeze outwardly as well as inwardly when the set screws 27 are tightened, and accordingly the packing will seal this passageway as well as sealing between the coupling and the surface of the pipe engaged therein. The clamping set screws 31 are turned inwardly until they firmly engage the outside surface of the pipe so that they will resist longitudinal pull of the pipe from the sleeve.

One particular use for this coupling is for joining pipeline sections quickly and securely whereby the amount of time that the line is out of service is reduced to a minimum. The pipe line may be restored to service just as soon as the sleeve is mounted around the pipe sections and the set screws tightened down. Thus, the coupling may be readily connected to a pipe-line section by hand tools to restore service quickly and safely.

The final seal of the sleeve to the pipe is effected by welding as shown in Figure 1, and this may be done at any time after the seal is effected by tightening the set screws. This condition may continue for several days or even months before the welding operator reaches the job to make the permanent welded connection. In this way it is not necessary for the welder to go immediately to the job and weld the sleeve to the pipes but may schedule his welding operations in a safe and efficient manner to produce the largest amount of effective work over a given length of time. In welding the sleeve to the pipes, the first operation is to string or deposit a fillet weld 35 around the ends of the couplings and secure same to the pipe. This effects a definite seal between the bore 13 of the sleeve and the pipe. As illustrated in Figure 1 th set screws 27 are far enough back in their openings 26 so that the weld from the fillet does not reach the set screws, and thus, this weld does not interfere with a tool engaging the thrust set screws 27 whereby they may be still tightened even though the sleeve is welded to the pipes. The distance from the end 14 of the coupling back to the thrust ring 24 is ample so that the effective length of threaded openings 26 eliminates any danger of the set screw threads being stripped. Also, after the coupling is installed and the thrust set screws 27 have been tightened and pressure is turned into the pipe line, thereby placing an additional load on the thrust set screws, the extra length of the threads in the openings 26 over and above the length of the recessed set screws 27 provides an added safety factor.

It is to be observed that the clamping set screws 31 when fully turned in against the pipe are recessed within the threaded holes 30, and the welder plug welds these holes with a plug of welding material as indicated by the reference character 34. The plug weld thus produced is a perfect seal against the escape of fluid through the threaded openings. In practice, the clamping set screws 31 are preferably hardened, high tensile strength steel for making a firm bite into the pipe to prevent longitudinal movement of the pipe from the bore of the sleeve and by providing a recessed space on top of the set screws 31, a sufficient amount of welded material may be disposed to make a good seal. When weld metal is deposited over the top of the set screws 31 in order to effect a good leak-proof sealing weld, sufficient welding rod may be deposited to dilute the high tensile strength steel of the set screws, so that the resulting weld will be soft enough to cold stress relieve itself. If the top of the set screws 31 were flush with the outside of the sleeve, the sealing weld would be apt to contain so much of the high tensile strength steel that it would be brittle and have pin holes, resulting in breaks or leaks. The set screws 27 are likewise recessed in their respective openings 26 and may be plug welded at 36 the same as that described for the set screws 31. It should also be noted that the thrust set screw openings 26 provide a certain amount of additional flexibility to the coupling end so that when the fillet weld is made at the end, the coupling can more readily expand and yield as the weld metal cools and sets up stresses. The thrust set screw opening in the ends of the coupling assist in cold relieving of field weld stresses. This stress relieving is of utmost importance.

With the coupling described herein the rejoining of the pipe line can be performed in a manner calculated to reduce fire and explosion hazards to a minimum where pipe lines used for conducting inflammable fluids are involved. The clamping set screws 31 permit adjustment of the annular space between the inner bore of the coupling and the outer pipe wall. For example, if the bottom of the pipe is badly pitted and the sides and top are not so badly pitted as is frequently the case, the set screws 31 are used to draw the coupling closer to the pipe where the pits are deepest, thus providing for a more effective disposition of the packing ring when pressure is applied to it by the thrust rings. The deeply pitted wall being closer, the packing ring can more effectively be forced to flow down into the bottom of the pits. Also, where the pipe exterior is fairly uniform the annular space may be equalized for more uniform welding. The clamping set screws 31 likewise maintain the adjustment of said annular space while the thrust set screws 27 are tightened and packing rings are being compressed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A pipe coupling for repair of pipelines or the like, comprising, first and second sleeve sections in substantially abutting relationship, each of said sleeve sections comprising inner and outer portions, each of said outer portions having flat radial inner and outer walls defining the longitudinal extent of such portions, said inner and outer portions having inner surfaces defining continuous concentric axial bores therethrough, said inner walls defining connecting walls between said inner and outer portion inner surfaces, an annular ring sleeve liner having an inner surface defining a through bore and a cylindrical outer surface, said sleeve liner being carried by said inner portions, said inner portion inner surfaces being in snug peripheral engagement with said liner outer surface, said sleeve sections and said liner being welded together, said liner having first and second end walls, said liner end walls being spaced from said sleeve section inner walls to provide a pair of inwardly directed grooves, first and second annular packing rings carried in said grooves, said first packing ring being interposed between said first liner end wall and said first sleeve section inner wall, said second packing ring being interposed between said second liner end wall and said second sleeve section inner wall, first and second annular unitary thrust rings, said first thrust ring being interposed between said first packing ring and said first sleeve section inner wall, said second thrust ring being interposed between said second packing ring and said second sleeve section inner wall, said thrust and packing rings each having inner and outer surfaces, said thrust and packing ring outer surfaces being in close association with said inner portion inner surfaces, said outer end portion, said liner, said packing ring and said thrust ring inner surfaces defining a through substantially cylindrically contoured bore, said outer portions each having at least three threaded bores extending longitudinally therethrough, the threaded bores being continuous with said inner portion bores, a thrust screw threaded into each of said threaded bores to press the thrust rings axially toward one another to axially compress and radially expand the packing rings, and clamping means carried by said sleeve sections to fix the coupling to prevent axial relative movement of the coupling and pipes which are to be connected.

References Cited in the file of this patent

UNITED STATES PATENTS

| | | |
|---|---|---|
| 2,145,645 | Byers | Jan. 31, 1939 |
| 2,186,974 | Ice | Jan. 16, 1940 |
| 2,567,243 | Smith | Sept. 11, 1951 |

FOREIGN PATENTS

| | | |
|---|---|---|
| 677,319 | Germany | May 25, 1939 |
| 883,048 | France | June 22, 1943 |